June 14, 1927.

S. J. BELL 1,632,326

COOKING UTENSIL

Filed Oct. 21, 1925

INVENTOR.
Samuel J. Bell,
BY
Frank A. Cutter,
ATTORNEY.

Patented June 14, 1927.

1,632,326

UNITED STATES PATENT OFFICE.

SAMUEL J. BELL, OF WEST SPRINGFIELD, MASSACHUSETTS.

COOKING UTENSIL.

Application filed October 21, 1925. Serial No. 63,873.

My invention relates to improvements in cooking utensils of the type commonly known as egg-cups, and consists essentially of an approximately semi-spherical cup mounted on a support and provided with an interior separator blade and an exterior handle, all of peculiar construction and combined in a novel manner, as hereinafter more fully set forth.

The primary object of my invention is to produce a comparatively simple and inexpensive utensil, for cooking individually eggs, either poached or boiled, and gelatinous food substances and other foods in small or individual portions, and for "dishing" ice cream in individual portions, from which the contents can be easily and quickly separated and discharged, without losing its original shape or form, that is to say, the shape or form which the cup gives to the egg or other food. A partial revolution imparted to the bottom member or support of the utensil is all that is required to separate from the cup of the utensil the contents of said cup, and then the discharge of such contents is effected simply by inverting the cup and permitting the contents to drop out of the same.

Another object is to provide novel means for connecting the separator blade with the support, through the bottom of the cup, in such a manner that said blade must turn with said support, and this without the use of solder.

A further object is to provide means for attaching the handle to the cup without the use of solder or special tools other than those employed in the construction of the parts originally.

Other objects and advantages will appear in the course of the following description.

I attain the objects and secure the advantages of my invention by the means illustrated in the accompanying drawings, in which—

Figure 1:
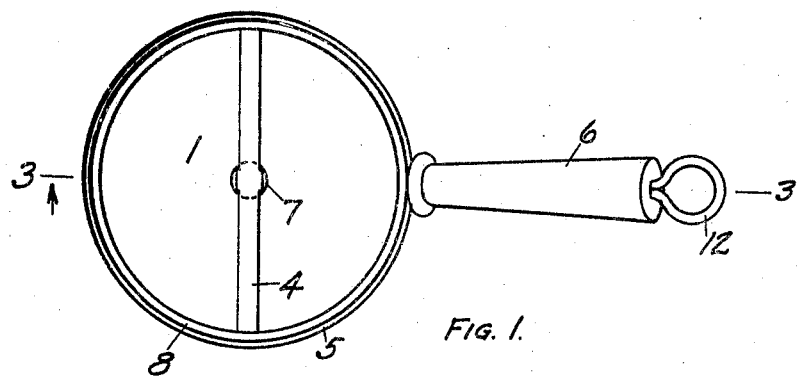
Figure 2:
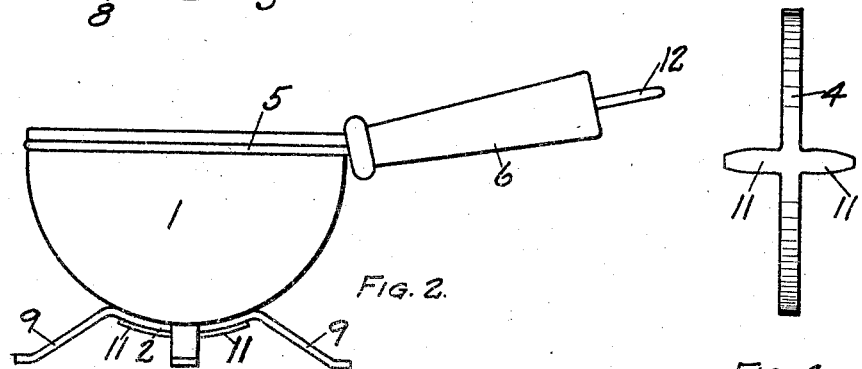
Figure 4:
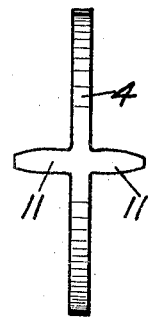
Figure 3:
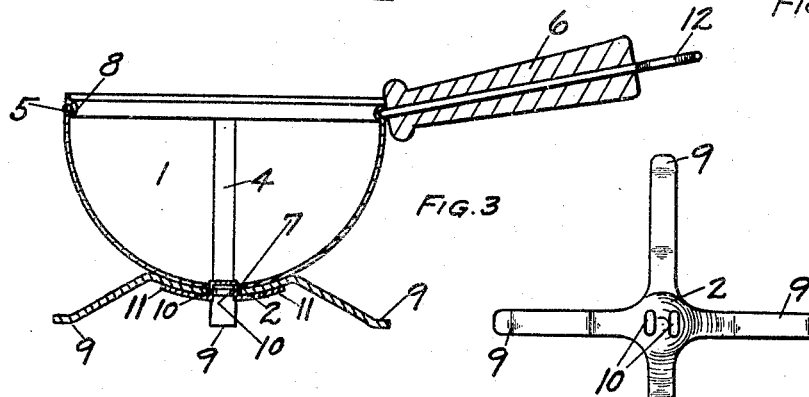
Figure 5:
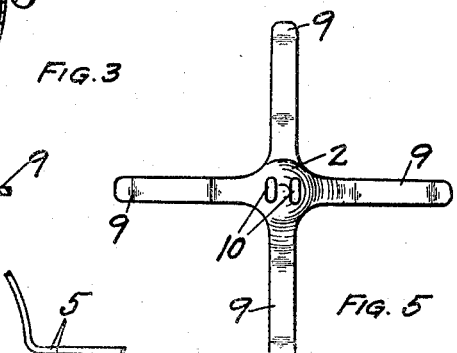

Figure 1 is a top plan of a cooking utensil which embodies a practical form of my invention; Fig. 2, a side elevation of said utensil; Fig. 3, a central, vertical section through the utensil, taken on lines 3—3, looking in the direction of the associated arrow, in Fig. 1; Fig. 4, a top plan of the separator blade before the lugs thereof are bent into operative position; Fig. 5, a bottom plan of the supporting member, and, Fig. 6, a fragmentary detail in top plan of the wire support for the handle.

Similar reference characters designate similar parts throughout the several views.

This utensil comprises a cup 1, a support 2, a separator blade 4, and a wire support 5 for a handle 6.

The cup 1 is approximately semi-spherical and has a central opening 7 in the bottom and an internal bead 8 just below the top, which top is open. The cup 1 is preferably made of thin sheet-metal, as also are the support 2 and the separator blade 4.

The support 2 consists of a central part from which extend four legs or feet 9. In the support 2 on opposite sides of the axial center thereof are two parallel slots 10.

The separator blade 4 is an approximately semi-circular member which fits within the cup 1 against the inside thereof, with the ends of said blade below the bead 8. Extending from opposite sides of the central portion of the blade 4 are two lugs 11. These lugs are bent downwardly to extend through the opening 7 in the cup 1 and the slots 10 in the support 2, and then are bent outwardly in opposite directions beneath the bottom of said support, substantially as shown in Figs. 2 and 3. Thus it is seen that the lugs 11 serve the triple purpose of holding the bottom of the blade 4 in place in the bottom of the cup 1, in holding the support 2 against the under side of said cup, and in fastening together said blade and support so that the former can be actuated or rotated by means of the latter. The portions of the lugs 11 which pass through the opening 7 engage the edges of said opening and thus maintain the parts in proper axial relationship and prevent lost motion. Obviously, if the support 2 be rotated the blade 4 will be rotated with it, in spite of the fact that said support is outside and said blade inside of the cup 1, since the portions of the lugs 11 which are in the opening 7 are free to rotate in said opening. The lugs 11 have no independent movement in the slots 10.

Figure 6:
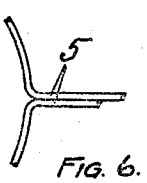

The support 5 consists of a piece of wire bent to form an enlargement or ring 12, then extended in parallel relationship one part with another to form a shank for the handle 6, and then extended in opposite directions to form two semi-circular parts or bows that are received in the groove formed by the bead 8. The manner in which the wire which forms the support 5 is disposed to form the shank for the handle 6 and then caused to branch off in opposite directions to produce the bows that embrace the beaded part of the cup 1 is illustrated in Fig. 6. The handle 6 is located between the ring 12 and the parts of the wire of the support 5 which branch off to embrace the cup. Since the free ends of the support 5 are unattached to each other, the bowed portions of said support can be expanded and forced over the top of the cup 1 into place in the groove therein.

The support 2 affords stable means for placing the utensil in upright position in a kettle or on a table, and serves as a convenient member for rotating the blade 4.

To remove the contents of the cup 1 therefrom, first impart a half revolution to the support 2, to move the blade 4 all the way around in said cup, between the sides thereof and said contents, below the bead 8, thus completely separating said contents from said sides, and then invert said cup over a dish, when said contents drops out into said dish. Ordinarily the contents of the cup does not extend above the bead 8. It is clearly apparent that the contents of the cup can thus be removed intact, or without changing in the operation the form given the same by the cup.

The handle 6 affords convenient means for moving the utensil from place to place, and for inverting and holding the same while the contents is being separated and discharged or dumped out.

If the separator blade 4 did not form an approximately complete semi-circle, it would be necessary, in order to separate the contents of the cup from the sides thereof, to impart a complete revolution to the support 2 and said blade, which would render the operation less convenient than it is in the present case where approximately only one-half of a revolution of the parts is needed for the operation.

More or less change in the shape, size, construction, and arrangement of some or all of the parts of this utensil may be made without departing from the spirit of my invention or exceeding the scope of what is claimed.

What I claim as my invention, and desire to secure by Letters Patent, is—

1. The combination, in a cooking utensil of the class described, with a cup having a bottom perforation therein, of a support beneath said cup, a separator blade within said cup, and lugs passing from said blade through said perforation to engage said support, whereby the blade is actuated when the support is rotated.

2. The combination, in a cooking utensil of the class described, with a cup having a perforation in the bottom thereof, of a support having slots therein beneath said cup, and a separator blade provided with lugs within said cup, said lugs passing downwardly through said perforation and slots and being bent outwardly beneath said support.

3. The combination, in a cooking utensil of the class described, with a cup having engaging means, and provided with a bottom support, of a handle consisting of a wire bent to form a loop, a shank of parallel parts, and bows to embrace said cup and be held in place by said engaging means, and a grip mounted on said shank between the junctions of said bows with said shank and said loop.

SAMUEL J. BELL.